(12) United States Patent
Stoian et al.

(10) Patent No.: US 7,989,399 B2
(45) Date of Patent: Aug. 2, 2011

(54) DRILLING FLUID AND METHODS

(75) Inventors: Stefan Alexandru Stoian, Calgary (CA); Carl Keith Smith, Calgary (CA)

(73) Assignee: Techstar Energy Services Inc., Calgary (CA)

( * ) Notice: Subject to any disclaimer, the term of this patent is extended or adjusted under 35 U.S.C. 154(b) by 592 days.

(21) Appl. No.: 12/025,164

(22) Filed: Feb. 4, 2008

(65) Prior Publication Data

US 2008/0217064 A1 Sep. 11, 2008

Related U.S. Application Data

(60) Provisional application No. 60/894,121, filed on Mar. 9, 2007.

(30) Foreign Application Priority Data

Jul. 19, 2007 (CA) .................................... 2594108

(51) Int. Cl.
*C09K 8/035* (2006.01)
*E21B 21/06* (2006.01)

(52) U.S. Cl. ........ 507/136; 507/110; 507/127; 507/128; 507/137; 507/138; 507/139; 507/142; 507/143; 507/261; 507/266; 175/64; 175/72

(58) Field of Classification Search ........................ None
See application file for complete search history.

(56) References Cited

U.S. PATENT DOCUMENTS

| | | | | |
|---|---|---|---|---|
| 3,692,125 A * | 9/1972 | Ruhle | .............. | 175/65 |
| 3,983,078 A | 9/1976 | Collins | | |
| 4,468,334 A * | 8/1984 | Cox et al. | ............. | 507/110 |
| 4,645,608 A * | 2/1987 | Rayborn | ............. | 507/128 |
| 5,476,610 A * | 12/1995 | Schmid et al. | ............. | 510/532 |
| 5,591,700 A * | 1/1997 | Harris et al. | ............. | 507/214 |
| 5,618,780 A * | 4/1997 | Argillier et al. | ............. | 508/503 |
| 5,723,423 A * | 3/1998 | Van Slyke | ............. | 510/188 |
| 5,968,370 A * | 10/1999 | Trim | ............. | 210/723 |
| 6,018,063 A * | 1/2000 | Isbell et al. | ............. | 554/213 |
| 7,718,581 B2 * | 5/2010 | Egli et al. | ............. | 507/136 |
| 2004/0204324 A1 | 10/2004 | Baltoiu et al. | | |
| 2005/0003967 A1 * | 1/2005 | Rea et al. | ............. | 507/200 |
| 2005/0014655 A1 * | 1/2005 | Aston et al. | ............. | 507/211 |
| 2005/0037927 A1 | 2/2005 | Horton | | |
| 2005/0037941 A1 * | 2/2005 | Munoz et al. | ............. | 510/424 |
| 2005/0113264 A1 * | 5/2005 | Vollmer | ............. | 507/211 |
| 2005/0199428 A1 * | 9/2005 | Dixon | ............. | 175/65 |
| 2006/0003899 A1 | 1/2006 | Levey et al. | | |
| 2008/0194435 A1 * | 8/2008 | Huff et al. | ............. | 507/224 |
| 2010/0009879 A1 * | 1/2010 | Theyssen et al. | ............. | 508/431 |

FOREIGN PATENT DOCUMENTS

WO WO 2004025080 A2 * 3/2004
WO WO 2004/050790 6/2004

OTHER PUBLICATIONS

Surface Chemistry in the Petroleum Industry, Chapter 11, Handbook of Applied Surface and Colloid Chemistry, pp. 251-266, 2001.
Drilling Engineering Challenges in Commercial SAGD Well Design in Alberta, R. Knoll and K. C Yeung, Society of Petroleum Engineers, SPE 62862, Jun. 19-23, 2000.
Novel Drilling Fluid Eliminates Tar Problems Associated with Drilling SAGD Wells, M A Freeman, A. Stoian, J. W. Potapinski, L. C. Elias, M-I Swaco and R. Tetreault, Society of Petroleum Engineers, SPE 90986, Sep. 26-29, 2004.
PetroCanada Process Fluids, DMO HT-40N for Onshore Drilling, Updated Jan. 12, 2000.

* cited by examiner

*Primary Examiner* — John J Figueroa
(74) *Attorney, Agent, or Firm* — Bennett Jones LLP

(57) ABSTRACT

A drilling fluid comprising: a non-ionic surfactant including at least one of a branched alcohol ethoxylate and a capped alcohol ethoxylate, a detergent builder and a viscosifier.

21 Claims, No Drawings

DRILLING FLUID AND METHODS

FIELD

The invention relates to fluids used for drilling and completing oil wells and in particular those useful for deterring tar/heavy oil accretion on metal surfaces.

BACKGROUND

The process of drilling a hole in the ground for the extraction of a natural resource requires a fluid for removing cuttings from the wellbore, controlling formation pressures and maintaining hole stability. Drilling through oil sand formations causes problematic accretion of tar on drilling apparatus. Bitumen accretion on metal surfaces impairs drilling operations by blinding shale shaker screens, plugging centrifuges and drill bits, torque and drag increase and stuck pipe or casing. Standard drilling practices through oil sand formations, which are generally unconsolidated, can also lead to hole instability problems.

Solvents, surfactants and viscosifiers have been used in drilling fluids for drilling through bitumen containing formations. In addition, or alternately, drilling fluids have been chilled to deter accretion and enhance hole stability.

SUMMARY

A drilling fluid and a method for drilling have been invented.

In accordance with one aspect of the present invention, there is provided a drilling fluid comprising: a non-ionic surfactant including at least one of a branched alcohol ethoxylate and a capped alcohol ethoxylate, a detergent builder and a viscosifier.

In accordance with another aspect of the present invention, there is provided a method for drilling a wellbore through a formation, the method comprising: operating a drilling assembly to drill a wellbore and circulating a drilling fluid through the wellbore as it is drilled, the drilling fluid including: a non-ionic surfactant including at least one of a branched alcohol ethoxylate and a capped alcohol ethoxylate, a detergent builder and a viscosifier.

It is to be understood that other aspects of the present invention will become readily apparent to those skilled in the art from the following detailed description, wherein various embodiments of the invention are shown and described by way of illustration. As will be realized, the invention is useful for other and different embodiments and its several details are capable of modification in various other respects, all without departing from the spirit and scope of the present invention. Accordingly the drawings and detailed description are to be regarded as illustrative in nature and not as restrictive.

DETAILED DESCRIPTION OF VARIOUS EMBODIMENTS

A drilling fluid and a method for drilling a wellbore has been invented for use in formations bearing heavy oil, also called bitumen or tar. The drilling fluid and method are useful to limit and possibly remove tar accretion on metal surfaces and/or to maintain borehole stability, while working with standard viscosifiers and other chemicals used in drilling fluids. The drilling fluid and method may therefore be environmentally responsible and economically viable.

A drilling fluid according to the present invention includes a non-ionic surfactant, a detergent builder and a viscosifier.

In this drilling fluid, it is believed that the non-ionic surfactant acts to limit tar sand accretion to metal surfaces perhaps by adsorbing onto surfaces or interfaces to change the interfacial tensions and/or the electrical potentials. The non-ionic surfactant may be effective in producing stearic barriers for prevention of tar deposition. The adsorption of the surfactant onto the bitumen will have the hydrophilic group oriented toward the metal. Surfactant molecules adsorbed onto the bitumen particles will have the hydrophilic group oriented toward the metal surfaces. Since viscosifiers may be anionic, a non-ionic surfactant avoids a reaction such as precipitation when operating with the viscosifiers. It is desired that the non-ionic surfactants have a water wetting, detergent characteristics, for example, that may have a hydrophilic-lipophilic balance (HLB) number of 11 to 15. Surfactants with an HLB over 15 may dissolve the bitumen and such solubility is generally not desirable as this may lead to hole instability, high washouts and waste volumes. The non-ionic surfactant may also be low foaming. Modifying the structure of the surfactant's molecule to keep the surface activity while producing unstable foam can be realized by replacing the straight-chain lipophilic group with a branched chain or by using two different sized or shaped lipophilic groups. Changes may be made on the hydrophilic part of the molecule by placing the second lipophobic group into the molecule at some distance, for example a few carbon atoms, or by putting two bulky lipophobic groups on the same carbon atom. Some useful non-ionic surfactants include capped or branched alcohol ethoxylate, such as for example ethoxylated alcohols, ethoxylated propoxylated alcohols, etc. "Capped" implies that —OH moieties are capped with a moiety such as a short alkyl group. Some commercially available non-ionic surfactants that may be useful in a drilling fluid may include one or more of:

alkyl polyethylene glycol ethers based on C10-guerbet alcohol and ethylene oxide, for example, available as Lutensol XP 69™, Lutensol XP 79™, Lutensol XP 89™, Lutensol XP 99™ produced by BASF. The Lutensol(r) XP types are manufactured by reacting the C10-alcohol with ethylene oxide in stoichiometric proportions. The numeric portion of the product name indicates the general degree of ethoxylation;

chlorine capped ethoxylated C10-14-ISO alcohols such as are available under the trademark Antarox BL-330™ produced by Rhodia;

chlorine capped ethoxylated C9-11-ISO, C10 rich alcohols such as are available under the trademark Antarox LF-330 produced by Rhodia;

end-capped guerbet alcohol ethoxylate for example, available as Dehypon G 2084™ produced by Cognis;

branched secondary alcohol ethoxylates for example, available as Tergitol TMN™ Series available from Dow.

The use of a non-ionic surfactant according to those described gives a drilling fluid detergent characteristics.

A drilling fluid according to the present invention further includes a detergent builder. As will be appreciated, a detergent builder enhances the action of a detergent. Generally, it is believed that builders operate as water wetting agents and remove cations such as of calcium ($Ca^{++}$) and magnesium ($Mg^{++}$), whose presence in the system may impair the detergent action. As such, a builder may reduce the amount of surfactant to be used over a system where no builder is used. This may offer numerous benefits including reducing the amount of tar which is dissolved into the drilling fluid, and thereby enhancing the reuse of the drilling fluid.

Inorganic builders of interest include phosphates, silicates, and oxygen releasing compounds such as perborates and borates. Some builders that may be of interest include one or more of:

phosphates including tetra-potassium pyrophosphate (TKPP), sodium acid pyrophosphate (STPP), trisodium phosphate (TSP), etc. The phosphate type of builders may also have beneficial dispersing properties, considering that significant amounts of reactive clays may be drilled and no additional dispersant may be required;

borates including for example sodium metaborate, sodium tetraborate pentahydrate. While some builders may have some adverse environmental effect, borates are believed to be environmentally friendly and therefore may be environmentally of interest in a drilling fluid formulation;

zeolites including sodium aluminum silicates readily replace their sodium ions with Ca2+ or Mg2+ ions. Complex systems of zeolite/polyacrylate may also be used;

nitrilotriacetic acid (NTA);

ethylenediaminetetracetic acid (EDTA) and its salts;

citrates; or potassium or sodium silicates and metasilicates. This type of builder may increase the friction coefficient in the system.

The use of a builder in the drilling fluid enhances performance of the surfactant such that generally less surfactant needs to be used compared to a system without a builder and the drilling fluid may be reused.

Viscosifiers provide carrying capacity to a drilling fluid. Viscosifiers, for example, increase the viscosity of drilling fluid so that it can carry cuttings along with the flow of drilling fluid. Viscosifiers may also act to reduce fluid loss by inhibiting fluid infiltration to the formation. Viscosifiers may prevent deposition or re-deposition of the bitumen on metal surfaces by suspending the tar and tar sand particles in the fluid. Some common viscosifiers useful in embodiments of the present drilling fluid may include, for example, any of: xanthan gum, wellan gum, schleroglucan and/or guar gum.

In one embodiment, a water-based drilling fluid may be prepared using 0.5-1.5% by weight surfactant, 0.5%-1.0% by weight builder and 0.2-0.4% by weight viscosifier.

In one example embodiment, a water-based drilling fluid may be prepared including: 0.5-1.5% by weight of alkyl polyethylene glycol ester, 0.5%-1.0% by weight of a phosphate-type builder or a borate-type builder and 0.2-0.4% by weight xanthan gum.

In one example embodiment, a water-based drilling fluid may be prepared including: 0.5-1.5% by weight of chlorine capped ethoxylated C9-11 (C10 rich) alcohol, 0.5%-1.0% by weight of a zeolite-type builder and 0.2-0.4% by weight xanthan gum.

A drilling fluid according to the present invention may also include, if desired, a lubricant, also termed a secondary surfactant. The lubricant may act to soften the tar and provide a lubricating action to assist drilling and running liners into long horizontal sections of a wellbore. The lubricant may be non-ionic. High flash point vegetable oils, such as those having a flash point greater than 148° C., may be of some use in the present drilling fluids. Useful lubricants may include, for example, fatty acid methyl esters for example with an HLB of about 6, such as are commonly available as soybean oil, for example, commercially available as SoyClear™ products by AG Environmental Products, LLC or Oleocal™ products by Lambent Technologies Corp., or canola oil. Lubricants may be added to the drilling fluid when the fluid is prepared, directly into the tanks and may alternately or in addition by added by application first to metal surfaces such as shale shakers, etc. at surface to thereby enter the drilling fluid stream.

In one embodiment, a water-based drilling fluid may be prepared as set out above including 0.5-1.5% by weight secondary surfactant such as, for example, 0.5-1.5% by weight of a methyl ester of soybean oil.

Fluid loss reducers may also be used in a drilling fluid according to the present invention if desired. Some common fluid loss reducers include, for example, starches, PAC (polyanionic cellulose) and/or CMC (carboxy methyl cellulose). Some of these chemicals may also have a viscosifying function. The fluid loss reduces may provide steric stabilization for the non-ionic surfactants.

The drilling fluid may contain various defoamers such as silicone defoamers, etc. as desired.

The drilling fluid is useful to inhibit tar accretion on metal surfaces. In one aspect the drilling fluid can be used in a method for drilling a wellbore through an oil sand containing formation. In such a method, without the present additive, tar and drill cuttings can adhere as accretions to the metal surfaces of the drilling assembly, and metal surfaces in the wellbore such as liners and casing. Thus, the present method includes circulating the aqueous-based drilling fluid, as described above, while operating a drilling assembly to drill the wellbore.

In another aspect the drilling fluid may be used to remove existing accretions on metal surfaces as by circulation through a wellbore or washing of the wellbore surface systems.

The drilling fluid may be reused repeatedly by simply removing drill cuttings it contains.

It will be appreciated that a drilling assembly can include, for example, a drill bit and possibly other cutting surfaces, a drill string, and various control and monitoring subs.

It will also be appreciated, that it may not be necessary to use the same drilling mud throughout an entire drilling operation. For example, a drilling mud selected to control accretion may not be required during drilling through the over burden. The method is particularly useful during drilling wherein oil sand drill cuttings are being produced and very useful where there is more frequent contact between metal surfaces or metal surfaces and the wellbore wall such as, for example, during drilling of the build section and the horizontal section of a wellbore.

Where, during drilling using a drilling fluid according to the present invention, accretions are being deposited to an undesirable extent, the composition can be adjusted to, for example, increase surfactant or secondary surfactant, to inhibit further undesirable amounts of accretion and possibly to remove, at least to some degree, those accretions already deposited.

EXAMPLES

In the following examples, the test additives are referenced by the product names set out in Table 1.

TABLE 1

| Product Name | Chemical Name | % by weight |
|---|---|---|
| Product A | Poly(oxy-1,2-ethanediyl), alpha (phenylmethyl)-omega-(1,1,3,3-tetramethylbutyl) phenoxy- | 85 |

TABLE 1-continued

| Product Name | Chemical Name | % by weight |
|---|---|---|
| | Glycols, polyethylene, mono[(1,1,3,3-tetramethylbutyl)phenyl] ether | 15 |
| | Polyethylene glycol | <3 |
| Product B | Oxirane, methyl-, polymer with oxyrane, mono(octylphenyl) ether, branched | >99 |
| | Polyethylene glycol | <1 |
| Product C | Modified polyethoxylated alcohol | 100 |
| Product D | C8-C10 ethoxylated propoxilated | >98 |
| | Polyethylene glycol | <2 |
| Product E | Butanedioic acid, octenyl- | <63 |
| | Anionic surfactant | >35 |
| Product F | Ethoxylated 2,4,7,9-tetramethyl 5 decyn-4,7-diol | 100 |
| Product G | Poly(oxy-1,2-ethanediyl), alpha.(2-propylheptyl)-omega-hydroxy- | 100 |
| Product H | Poly(oxy-1,2-ethanediyl), alpha.(2-propylheptyl)-omega-hydroxy- | 100 |
| Product I | Poly(oxy-1,2-ethanediyl), alpha-(2-propylheptyl)-omega-hydroxy- | 100 |
| Product J | Poly(oxy-1,2-ethanediyl), alpha-(2-propylheptyl)-omega-hydroxy- | 100 |
| Product K | Ethoxylated C9-10 alcohols | >99.5 |
| Product L | Ethoxylated C8-10 alcohols | >99.5 |
| Product M | Chlorine capped ethoxylated C10-14 alcohols | >94 |
| Product N | Chlorine capped ethoxylated C9-11 alcohols, C10 rich | >94 |
| Product O | Triterpene, Sapogenin glycosides, vegetal steroid | 100 |

TABLE 1-continued

| Product Name | Chemical Name | % by weight |
|---|---|---|
| Product P | Sodium tetraborate decahydrate | 100 |
| Product Q | Tetrapotassium pyrophosphate | 100 |
| Product R | Sodium Metaborate | 100 |
| Product S | Sodium silicate | 82.5 |
| Product T | Zeolite | 78-82 |
| Product U | Pine oil | 100 |
| Product V | Methyl ester of soybean oil | 100 |
| Product W | Turpentine oil | 100 |
| Product X | Diethyl Phthalate | 100 |
| Product Y | Derived from canola oil | 100 |
| Product Z | Sodium tetraborate pentahydrate | 100 |
| Milligan MBTI P01D | Methyl ester of canola oil | 100 |
| Milligan MBTI P03D | Methyl ester of canola oil | 100 |
| Milligan MBTI P04D | Methyl ester of canola oil | 100 |
| Milligan MBTI P05D | Methyl ester of canola oil | 100 |
| Milligan MBTI P06D | Methyl ester of canola oil | 100 |

Tables 2 to 14 includes results from various tests conducted, wherein the samples are prepared by adding 200 mL of water in a mixing cup followed by the test additives and by 40 g of tar sand core material. Each sample is then mixed 15 to 20 seconds on a multimixer prior to placement in 260 mL rolling cell with a corresponding pre-weighed metal bar. The samples are rolled for 30 min. Then the tar accretion is measured by weight gain of the bars and by observation. The tests are run at room temperature.

TABLE 2

| Sample Number | Product | Conc. L/m3 | Foaming | Tar on bar Weight (g) | Tar on Cell | Tar on Lid | Notes |
|---|---|---|---|---|---|---|---|
| 1 | Blank | | | 1.3 | 100% | 100% | |
| 2 | Product A | 5 | ** | 3.0 | 50% | 5% | |
| 3 | Product B | 5 | ** | 2.0 | 40% | 60% | |
| 4 | Product C | 5 | **** | 3.4 | 90% | 95% | Milky in water Thin |
| 5 | Product D | 5 | * | 1.9 | 90% | 100% | |
| 6 | Product E | 5 | * | 3.5 | 95% | 100% | Milky in water Thick |

TABLE 3

| Sample Number | Product | Conc. L/m3 | Foaming | Tar on bar Weight (g) | Tar on Cell | Tar on Lid | Notes |
|---|---|---|---|---|---|---|---|
| 1 | Blank | | | 2.6 | 100% | 80% | |
| 2 | Product B | 10 | ** | 3.1 | trace | Trace | |
| 3 | Product B Product Y | 5 10 | ** | 1.6 | 50% | 35% | |
| 4 | Product B Product Y | 10 10 | **** | 3.8 | 10% | 30% | |
| 5 | Product B Product Y | 5 20 | *** | 2.8 | 80% | 30% | |
| 6 | Product Y | 10 | | 1.8 | 100% | 100% | Oil and tar separates from water |

TABLE 4

| Sample Number | Product | Conc. L/m3 | Foaming | Tar on bar Weight (g) | Tar on Cell | Tar on Lid | Notes |
|---|---|---|---|---|---|---|---|
| 1 | Product A | 10 | ** | 4.5 | 60% | 2% | |
| 2 | Product A | 20 | **** | 5.6 | 1% | 0% | The tar is sticking to the bar |
| 3 | Product A Product V | 5 10 | ** | 0.6 | 90% | 100% | |
| 4 | Product A Product V | 5 20 | * | 1.4 | 90% | 10% | |
| 5 | Product A Product V | 10 20 | ** | 2.0 | 95% | 5% | |
| 6 | Product V | 30 | | 0.3 | Oil with dissolved tar | Oil with dissolved tar | |

TABLE 5

| Sample Number | Product | Conc. L/m3 | Foaming | Tar on bar Weight (g) | Tar on Cell | Tar on Lid | Notes |
|---|---|---|---|---|---|---|---|
| 1 | Product A Product W | 5 10 | ** | 1.5 | 95% | 3% | |
| 2 | Product A Product W | 10 10 | *** | 1.1 | 20% | 25% | |
| 3 | Product A Limonene | 10 20 | *** | 0.5 | 20% | 100% | |
| 4 | Product A Limonene | 5 10 | ** | 1.1 | 20% | 40% | |
| 5 | Product A Limonene | 10 10 | *** | 2.7 | 20% | 25% | |
| 6 | Product A Limonene | 10 20 | *** | 2.6 | 15% | 100% | |

TABLE 6

| Sample Number | Product | Conc. L/m3 | Foaming | Tar on bar Weight (g) | Tar on Cell | Tar on Lid | Notes |
|---|---|---|---|---|---|---|---|
| 1 | Product F | 5 | * | 2.8 | 90% | 40% | |
| 2 | Product G | 5 | ** | 1.9 | 90% | 5% | |
| 3 | Product H | 5 | **** | 1.1 | 90% | 95% | Bottom of cell clean |
| 4 | Product I | 5 | **** | 1.8 | 100% | 60% | |
| 5 | Product J | 30 | ***** | 2.5 | 80% | 40% | |
| 6 | Limonene | 30 | | 0.2 | 0% | 5% | Film |

TABLE 7

| Sample Number | Product | Conc. L/m3 | Foaming | Tar on bar Weight (g) | Tar on Cell | Tar on Lid | Notes |
|---|---|---|---|---|---|---|---|
| 1 | Product A Limonene Product Q | 10 20 5 | — | 0.1 | No | No | Some oily film |
| 2 | Product B Limonene Product Q | 10 20 5 | *** | 0.1 | No | No | Some oily film |
| 3 | Product D Limonene Product Q | 10 20 5 | ** | 0.1 | No | No | Some oily film |
| 4 | Product E Limonene Product Q | 10 20 5 | ** | 0.1 | No | No | Some oily film |
| 5 | Product G Limonene Product Q | 10 20 5 | **** | 0.1 | No | No | Totally clean |
| 6 | Product H Limonene Product Q | 10 20 5 | **** | 0.1 | No | No | Totally clean |

TABLE 8

| Sample Number | Product | Conc. L/m3 | Foaming | Tar on bar Weight (g) | Tar on Cell | Tar on Lid | Notes |
|---|---|---|---|---|---|---|---|
| 1 | Product G | 10 | * | — | — | — | |
| | Limonene | 15 | | | | | |
| | Product Q | 5 | | | | | |
| | Defoamer Silicone | 5 | | | | | |
| 2 | Product H | 10 | * | — | — | — | |
| | Limonene | 15 | | | | | |
| | Product Q | 5 | | | | | |
| | Defoamer Silicone | 5 | | | | | |
| 3 | Product G | 10 | * | — | — | — | |
| | Product X | 15 | | | | | |
| | Product Q | 5 | | | | | |
| | Defoamer Silicone | 5 | | | | | |
| 4 | Product H | 10 | * | — | — | — | |
| | Product X | 15 | | | | | |
| | Product Q | 5 | | | | | |
| | Defoamer Silicone | 5 | | | | | |
| 5 | Product G | 10 | * | — | — | — | Cleanest |
| | Product V | 15 | | | | | |
| | Product Q | 5 | | | | | |
| | Defoamer Silicone | 5 | | | | | |
| 6 | | | | | | | |

TABLE 9

| Sample Number | Product | Conc. L/m3 | Foaming | Tar on bar Weight (g) | Tar on Cell | Tar on Lid | Notes |
|---|---|---|---|---|---|---|---|
| 1 | Xanthan Gum | 5 | * | — | — | — | |
| | Product H | 5 | | | | | |
| | Product V | 10 | | | | | |
| | Product Q | 5 | | | | | |
| | Defoamer Silicone | 10 | | | | | |
| 2 | Xanthan Gum | 5 | * | — | — | — | |
| | Product K | 5 | | | | | |
| | Product V | 10 | | | | | |
| | Product Q | 5 | | | | | |
| | Defoamer Silicone | 5 | | | | | |
| 3 | Xanthan Gum | 5 | * | — | — | — | |
| | Product L | 10 | | | | | |
| | Product V | 5 | | | | | |
| | Product Q | 5 | | | | | |
| | Defoamer Silicone | 5 | | | | | |
| 4 | Xanthan Gum | 5 | * | — | 5% | — | |
| | Product M | 5 | | | | | |
| | Product V | 10 | | | | | |
| | Product Q | 5 | | | | | |
| | Defoamer Silicone | — | | | | | |
| 5 | Xanthan Gum | 5 | * | — | — | — | |
| | Product N | 5 | | | | | |
| | Product V | 10 | | | | | |
| | Product Q | 5 | | | | | |
| | Defoamer Silicone | — | | | | | |
| 6 | Xanthan Gum | 5 | * | 1.4 | trace | — | Has an oily film |
| | Product O | 5 | | | | | |
| | Product V | 10 | | | | | |
| | Product Q | 5 | | | | | |

TABLE 9-continued

| Sample Number | Product | Conc. L/m3 | Foaming | Tar on bar Weight (g) | Tar on Cell | Tar on Lid | Notes |
|---|---|---|---|---|---|---|---|
| | Defoamer Silicone | — | | | | | |

TABLE 10

| Sample Number | Product | Conc. L/m3 | Foaming | Tar on bar Weight (g) | Tar on Cell | Tar on Lid | Notes |
|---|---|---|---|---|---|---|---|
| 1 | Blank | | | 12.8 | 30% | 90% | |
| 2 | Product N | 10 | ** | — | — | — | |
|   | Product V | 10 | | | | | |
|   | Product Q | 5 | | | | | |
|   | Defoamer Silicone | — | | | | | |
| 3 | Product N | 10 | ** | 0.7 | — | — | |
|   | Product V | 10 | | | | | |
|   | Product P | 5 | | | | | |
|   | Defoamer Silicone | — | | | | | |
| 4 | Product N | 10 | ** | 0.5 | 5% | — | |
|   | Product V | 10 | | | | | |
|   | Product X | 10 | | | | | |
|   | Product P | 5 | | | | | |
|   | Defoamer Silicone | — | | | | | |
| 5 | Product P | 5 | | 7.4 | 50% | 100% | |
| 6 | Product Q | 5 | | 3.2 | 15% | 80% | |

TABLE 11

| Sample Number | Product | Conc. L/m3 | Foaming | Tar on bar Weight (g) | Tar on Cell | Tar on Lid | Notes |
|---|---|---|---|---|---|---|---|
| 1 | Xanthan Gum | 4 | — | — | — | — | |
|   | Product H | 5 | | | | | |
|   | Product V | 10 | | | | | |
|   | Product Q | 5 | | | | | |
| 2 | Xanthan Gum | 4 | — | — | trace | — | Easy to clean with water |
|   | Product H | 5 | | | | | |
|   | Product V | 10 | | | | | |
|   | Product S | 5 | | | | | |
| 3 | Xanthan Gum | 4 | — | — | 5% | — | Easy to clean with water |
|   | Product H | 5 | | | | | |
|   | Product V | 10 | | | | | |
|   | Product T 100 | 5 | | | | | |
| 4 | Xanthan Gum | 4 | — | — | — | — | |
|   | Product N | 5 | | | | | |
|   | Product V | 10 | | | | | |
|   | Product Q | 5 | | | | | |
| 5 | Xanthan Gum | 4 | — | — | trace | — | Easy to clean with water |
|   | Product N | 5 | | | | | |
|   | Product V | 10 | | | | | |
|   | Product S | 5 | | | | | |
| 6 | Xanthan Gum | 4 | — | — | 5% | — | Easy to clean with water |
|   | Product N | 5 | | | | | |
|   | Product V | 10 | | | | | |
|   | Product T 100 | 5 | | | | | |

TABLE 12

| Sample Number | Product | Conc. L/m3 | Foaming | Tar on bar Weight (g) | Tar on Cell | Tar on Lid | Notes |
|---|---|---|---|---|---|---|---|
| 1 | Xanthan Gum | 4.2 | — | — | — | — | — |
|   | Product H | 5 |   |   |   |   |   |
|   | Milligan MBTI | 10 |   |   |   |   |   |
|   | P01D |  5 |   |   |   |   |   |
|   | Product Q |   |   |   |   |   |   |
| 2 | Xanthan Gum | 4.2 | — | — | — | — | — |
|   | Product H | 5 |   |   |   |   |   |
|   | Milligan MBTI | 10 |   |   |   |   |   |
|   | P03D | 5 |   |   |   |   |   |
|   | Product Q |   |   |   |   |   |   |
| 3 | Xanthan Gum | 4.2 | — | — | — | — | — |
|   | Product H | 5 |   |   |   |   |   |
|   | Milligan MBTI | 10 |   |   |   |   |   |
|   | P04D | 5 |   |   |   |   |   |
|   | Product Q |   |   |   |   |   |   |
| 4 | Xanthan Gum | 4.2 | — | — | — | — | — |
|   | Product H | 5 |   |   |   |   |   |
|   | Milligan MBTI | 10 |   |   |   |   |   |
|   | P05D | 5 |   |   |   |   |   |
|   | Product Q |   |   |   |   |   |   |
| 5 | Xanthan Gum | 4.2 | — | — | — | — | — |
|   | Product H | 5 |   |   |   |   |   |
|   | Milligan MBTI | 10 |   |   |   |   |   |
|   | P06D | 5 |   |   |   |   |   |
|   | Product Q |   |   |   |   |   |   |
| 6 | Xanthan Gum | 4.2 | — | — | — | — | — |
|   | Product H | 5 |   |   |   |   |   |
|   | Product U | 10 |   |   |   |   |   |
|   | Product Q | 5 |   |   |   |   |   |

TABLE 13

| Sample Number | Product | Conc. L/m3 | Foaming | Tar on bar Weight (g) | Tar on Cell | Tar on Lid | Notes |
|---|---|---|---|---|---|---|---|
| 1 | Blank | — | — | 11.4 | 30% | — | — |
| 2 | Xanthan Gum | 4.0 | — | — | — | — | — |
|   | Product H | 5 |  |  |  |  |  |
|   | Product V | 10 |  |  |  |  |  |
|   | Product Q | 5 |  |  |  |  |  |
|   | Defoamer Silicone | 2 |  |  |  |  |  |
| 3 | Xanthan Gum | 4.0 | — | — | — | — | — |
|   | Product H | 5 |  |  |  |  |  |
|   | Product V | 10 |  |  |  |  |  |
|   | Product R | 5 |  |  |  |  |  |
|   | Defoamer Silicone | 2 |  |  |  |  |  |
| 4 | Xanthan Gum | 4.0 | — | — | — | — | — |
|   | Product H | 5 |  |  |  |  |  |
|   | Product V | 10 |  |  |  |  |  |
|   | Product Z | 5 |  |  |  |  |  |
|   | Defoamer Silicone | 2 |  |  |  |  |  |
| 5 | Xanthan Gum | 4.0 | — | — | — | — | — |
|   | Product H | 5 |  |  |  |  |  |
|   | Milligan MBTI | 10 |  |  |  |  |  |
|   | P06D | 5 |  |  |  |  |  |
|   | Product Q Defoamer Silicone | 2 |  |  |  |  |  |
| 6 | Xanthan Gum | 4.0 | — | — | — | — | — |
|   | Product H | 5 |  |  |  |  |  |
|   | Product U | 10 |  |  |  |  |  |
|   | Product Q | 5 |  |  |  |  |  |
|   | Defoamer Silicone | 2 |  |  |  |  |  |

TABLE 14

| Sample Number | Product | Conc. L/m3 | Foaming | Tar on bar Weight (g) | Tar on Cell | Tar on Lid | Notes |
|---|---|---|---|---|---|---|---|
| 1 | Blank |  | — | 7.6 | 100% | Trace |  |
| 2 | Xanthan Gum | 4.0 | — | 2.1 | Trace | Trace |  |
|   | Product V | 10 |  |  |  |  |  |
| 3 | Xanthan Gum | 4.0 | — | 1.6 | Trace | Trace |  |
|   | Product V | 10 |  |  |  |  |  |
|   | Product H | 5 |  |  |  |  |  |
| 4 | Xanthan Gum | 4.0 | — | 1.8 | Trace | Trace |  |
|   | Product V | 30 |  |  |  |  |  |
| 5 | Xanthan Gum | 4.0 | — | 0.5 | Trace | Clean |  |
|   | Product H | 10 |  |  |  |  |  |
|   | Product Q | 5 |  |  |  |  |  |
| 6 | Xanthan Gum | 4.0 | — | 2.4 | Trace | Clean |  |
|   | Product H | 10 |  |  |  |  |  |
|   | Product V | 10 |  |  |  |  |  |

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope as defined in the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for drilling a wellbore through a formation, the method comprising: operating a drilling assembly to drill a wellbore and circulating a drilling fluid through the wellbore as it is drilled, the drilling fluid including: a non-ionic surfactant including at least one of [i.] an alkyl polyethylene glycol ethers based on C10-Guerbet alcohol and ethylene oxide and [ii.] a chlorine-capped alcohol ethoxylate; a detergent builder; and a viscosifier.

2. The method of claim 1 further comprising a lubricant added to the drilling fluid by washing of equipment at surface or directly when preparing the drilling fluid.

3. The method of claim 1 wherein the drilling fluid is reused.

4. The method of claim 1 wherein drill cuttings are removed from the drilling fluid prior to reuse.

5. The method of claim 1 wherein the non-ionic surfactant includes an HLB number of 11 to 15.

6. The method of claim 1 wherein the non-ionic surfactant includes alkyl polyethylene glycol ethers based on C10-Guerbet alcohol and ethylene oxide.

7. The method of claim 1 wherein the non-ionic surfactant includes chlorine capped ethoxylated C10-14-ISO alcohols.

8. The method of claim 1 wherein the non-ionic surfactant includes chlorine capped ethoxylated C9-11 ISO, C10 rich alcohols.

9. The method of claim 1 wherein the detergent builder includes a phosphate-type builder.

10. The method of claim 1 wherein the detergent builder includes a zeolite-type builder.

11. The method of claim 1 wherein the detergent builder includes a borate-type builder.

12. The method of claim 1 wherein the viscosifier includes xanthan gum.

13. The method of claim 1 wherein the drilling fluid further comprises a lubricant.

14. The method of claim 13 wherein the lubricant includes a fatty acid methyl ester.

15. The method of claim 13 wherein the lubricant includes soybean oil.

16. The method of claim 13 wherein the lubricant includes canola oil.

17. The method of claim 13 wherein the lubricant has a flash point greater than 148° C.

18. The method of claim 1 wherein the drilling fluid is water-based and comprises: 0.5-1.5% by weight of the surfactant, 0.5%-1.0% by weight of the builder, 0.2-0.4% by weight of the viscosifier.

19. The method of claim 18 wherein the drilling fluid further comprises: 0.5-1.5% by weight of a non-ionic lubricant.

20. The method of claim 1 wherein the drilling fluid is water-based and comprises: 0.5-1.5% by weight surfactant including alkyl polyethylene glycol ester; 0.5%-1.0% by weight of at least one of: a phosphate-type builder and a borate-type builder; 0.2-0.4% by weight of a viscosifier including xanthan gum; and 0.5-1.5% by weight of a methyl ester of soybean oil.

21. The method of claim 1 wherein the drilling fluid is water-based and comprises: 0.5-1.5% by weight of a surfactant including chlorine capped ethoxylated C9-11 (C10 rich) alcohol; 0.5%-1.0% by weight of a zeolite-type builder, 0.2-0.4% by weight of a viscosifier including xanthan gum; and 0.5-1.5% by weight of a methyl ester of soybean oil.

* * * * *